US006818345B1

(12) United States Patent
Partington et al.

(10) Patent No.: US 6,818,345 B1
(45) Date of Patent: Nov. 16, 2004

(54) BATTERY WITH TOP AND BOTTOM CONNECTING STRAPS AND ADDITIONAL VERTICAL CONNECTING BARS

(75) Inventors: Kenneth Michael Partington, Longridge (GB); David Colin Brown, Stourbridge (GB)

(73) Assignee: Chloride Industrial Batteries Limited, London (GB)

( * ) Notice: Subject to any disclaimer, the term of this patent is extended or adjusted under 35 U.S.C. 154(b) by 0 days.

(21) Appl. No.: 09/601,477

(22) PCT Filed: Jan. 20, 1999

(86) PCT No.: PCT/GB99/00194

§ 371 (c)(1),
(2), (4) Date: Oct. 23, 2000

(87) PCT Pub. No.: WO99/40638

PCT Pub. Date: Aug. 12, 1999

(30) Foreign Application Priority Data

Feb. 4, 1998 (GB) .............................................. 9802362

(51) Int. Cl.[7] .......................... H01M 2/22; H01M 2/26; H01M 2/28; H01M 10/04; H01M 10/12
(52) U.S. Cl. ...................................... 429/160; 429/225
(58) Field of Search ................................ 429/161, 152, 429/160, 163, 225, 151

(56) References Cited

U.S. PATENT DOCUMENTS

| 2,739,997 | A | * | 3/1956 | Carrick et al. ............... 429/225 |
| 3,914,134 | A | * | 10/1975 | Carson ........................ 429/160 |
| 3,922,175 | A | * | 11/1975 | Granqvist .................... 429/160 |
| 4,634,642 | A | * | 1/1987 | Lopez-Doriga Lopez-Doriga ............. 429/121 |
| 4,760,001 | A | | 7/1988 | Nann et al. |
| 4,983,475 | A | * | 1/1991 | Delans ........................ 429/121 |
| 5,348,817 | A | * | 9/1994 | Rao et al. .................... 429/210 |
| 5,470,679 | A | * | 11/1995 | Lund et al. .................. 429/156 |

FOREIGN PATENT DOCUMENTS

| EP | 0083330 A2 | 7/1983 | |
| EP | 0442599 A3 | 8/1991 | |
| GB | 1590947 | 6/1981 | |
| JP | 63 125 519 A | * 5/1988 | ................. 525/523 |

* cited by examiner

Primary Examiner—Gregg Cantelmo
(74) Attorney, Agent, or Firm—Young & Thompson

(57) ABSTRACT

A battery (10) having positive and negative plates (11, 12) contained in a housing. The upper edges of the positive plates are connected to the lower edges by means of a member (25; 28) also contained in the housing. The member (25; 28) comprises a material having a greater conductivity than that of the material of the plates.

17 Claims, 2 Drawing Sheets

BATTERY WITH TOP AND BOTTOM CONNECTING STRAPS AND ADDITIONAL VERTICAL CONNECTING BARS

BACKGROUND OF THE INVENTION

This invention relates to a battery (also known as an accumulator), particularly but not exclusively of the lead acid type.

One known lead acid battery comprises a plurality of rectangular plates arranged parallel to one another and separated by insulating separating sheets. Alternate plates are positive and negative electrodes respectively, all the positive electrodes being connected together electrically by a first connector and all the negative electrodes being connected together electrically by a second connector, the two connectors being connected to positive and negative terminals respectively.

If the plates, all rectangular, are relatively long and narrow, and the connector and/or terminal is connected to a narrow edge, then there is a relatively long conducting path for the current from the area of the plate adjacent the opposite narrow edge to the connector or terminal. Since the conductivity of lead is significantly less than that of a metal such as copper or aluminium, there is a limit to the current carrying capacity of each electrode, since increasing the current increases the heat generated within the plates. Thus, particularly where other factors dictate that a battery has electrodes which are long and narrow, and the terminals or connectors are attached to a narrow edge of the electrodes, and further if the battery is located in a confined space, the limit on the current carrying capacity is a considerable disadvantage.

EP-A-0442599 discloses a battery having a plurality of alternating positive and negative plates; at least one tab protruding from one edge of each of the positive and negative plates; at least one tab protruding from an opposite edge of each of the positive and negative plates; a pair of negative plate straps connecting together each tab protruding from each negative plate; a pair of positive plate straps connecting together each tab protruding from each positive plate; a first diagonal bar connecting together the pair of negative plate straps; and a second diagonal bar connecting together the pair of positive plate straps.

SUMMARY OF THE INVENTION

It is an object of the present invention to provide a battery having an improved current carrying capacity.

In accordance with the invention a battery comprises a housing containing a plurality of positive plates connected in parallel and a plurality of negative plates connected in parallel, the positive plates each being of substantially the same size and rectangular shape having two long edges and a first short edge and a second short edge, and the housing also containing a member having a first end and a second end, the first end being electrically connected to the first short edges of the positive plates adjacent one of the two sets of long edges and the second end being electrically connected to the second short edges of the positive plates adjacent the same set of long edges or to the same set of long edges of the positive plates immediately adjacent to the second short edges, the members extending parallel to the long edges for most of its length and consisting of a material which has a greater conductivity than the material of the positive plates.

The negative plates may each be substantially the same size and rectangular shape having two long edges and a first short edge and a second short edge, and a further member may be provided, the further member having a first end and a second end, the first end being electrically connected to the first short edges of the negative plates and the second end being electrically connected to the second short edges of the negative plates or to one of the long edges of the negative plates immediately adjacent to the second short edges, the further member consisting of a material which has a greater conductivity than the material of the negative plates.

The negative plates and the positive plates may all be substantially the same size and rectangular shape.

The first short edges of the positive plates may be connected by a first connector which is electrically connected to a positive terminal of the battery.

The second short edges of the positive plates may be connected by a further connector which is either of the same general material as the positive plates, e.g. in the case of a lead acid battery the material is lead, or, alternatively, of the same general material as the member.

If the battery is a lead acid battery, the member preferably comprises copper, or a copper alloy such as brass, or aluminium or an alloy thereof, covered in a lead sheath. The sheath may be covered in an acid resistant material such as an epoxy resin.

BRIEF DESCRIPTION OF THE DRAWINGS

Two embodiments of the invention will now be described by way of example only with reference to the accompanying drawings, of which

As shown in FIG. 1, the first embodiment of the invention comprises a lead acid battery 10 having a plurality of plates 11 and 12 alternately interleaved with separators 13 comprising sheets of microporous polyethylene and of nonwoven glass fibre. The plates 11 and 12 and separators 13 are positioned in face-to-face arrangement and alternate plates are of positive and negative polarity, the positive plates being indicated by reference numeral 11 and the negative plates by reference numeral 12.

Figure 1:
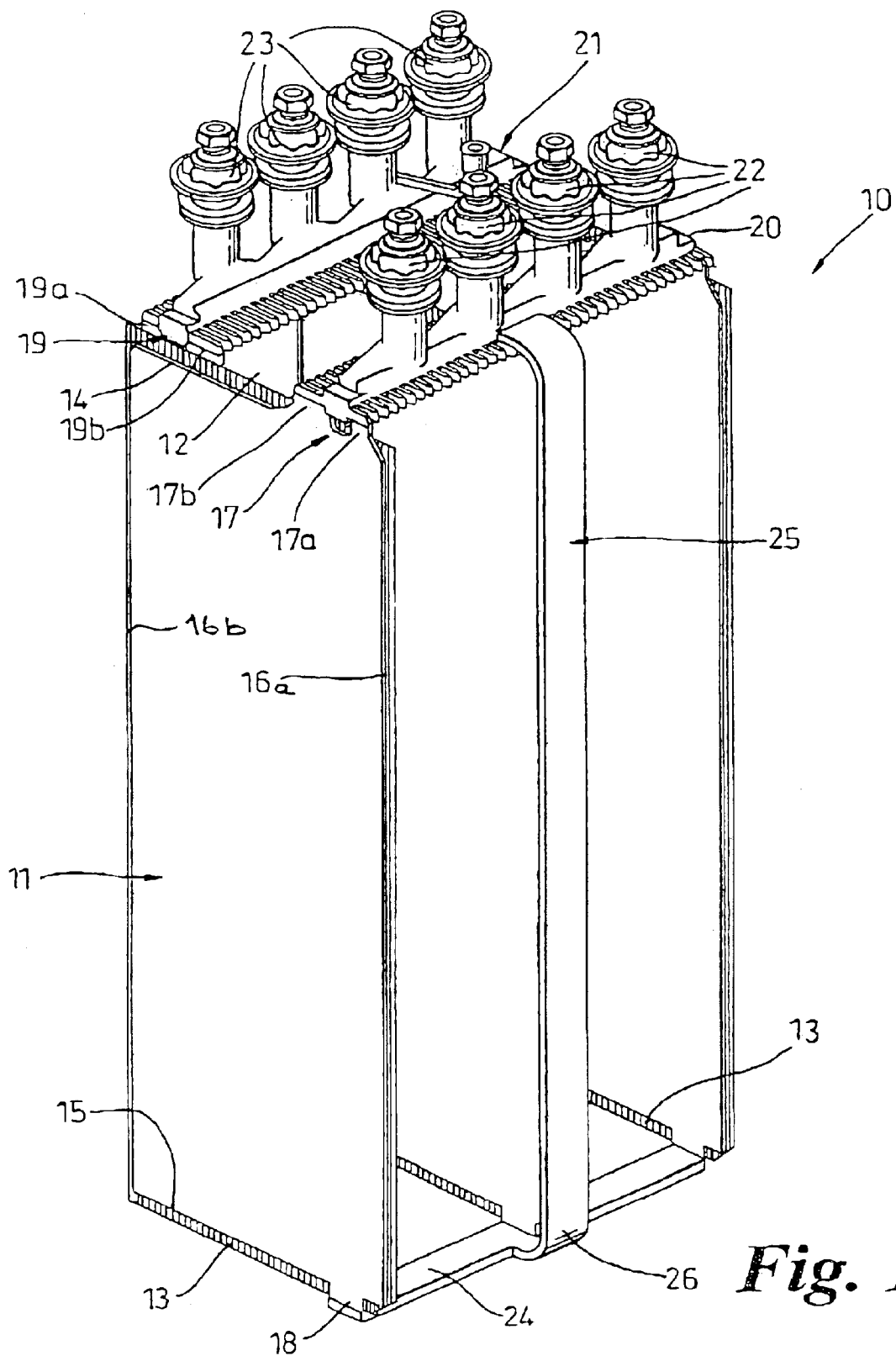
FIG. 1 shows a perspective view of the interior of a lead acid battery according to the first embodiment of the invention, some of the parts being omitted for clarity.

The plates and separators are housed in a rectangular container of plastics material (not shown) containing acid (not shown).

All the plates 11 and 12 are generally rectangular in shape and of generally the same size. The horizontal top edge 14 and bottom edge 15 of the plates (as shown) are much shorter than the vertical edges 16. The positive plates 11 are each provided on the top edge with a tag 17, having two parts 17a and 17b, adjacent a corner with a long edge. Directly below, each positive plate is provided on its lower edge with a tag 18 adjacent the corner with the same long edge. The plates are arranged so that the two tags are arranged in two rows, one row directly above the other. The negative plates are each formed with one tag 19 having two parts 19a and 19b on the top edge adjacent the corner with a long edge and the plates are arranged so that the tags 19 form a single row parallel to and spaced apart from the row of tags 17 on the upper edges of the positive plates.

The tags in each upper row lie in general side-by-side arrangement and are each connected by respective connectors 20 and 21. Two sets of terminals 22 and 23 are integrally formed with the respective connectors 20 and 21, the connectors and terminals being formed by a casting operation. The terminals and connectors are of high conductivity copper, embedded in a lead sheath by a casting process.

Connected to the lower row of tags 18 on the positive plates 11 is a further connector 24 in the form of a strip of lead or lead-sheathed copper which is connected by means of a member in the form of a strip 25 of lead-sheathed copper to the connector at the top of the positive plates 11. The connector 24 and member 25 are joined by any suitable process to one another, to the lower row of tags and to the upper row of tags to make good electrical connections. The lead sheath prevents corrosion by the acid.

As can be seen in the drawing, the further connector 24 lies in a horizontal plane perpendicular to the plane of the plate and the member 25 lies in a vertical plane perpendicular to the plane of the plate except for a small section 26 where it is curved for connection to the further connector 24.

Figure 2:
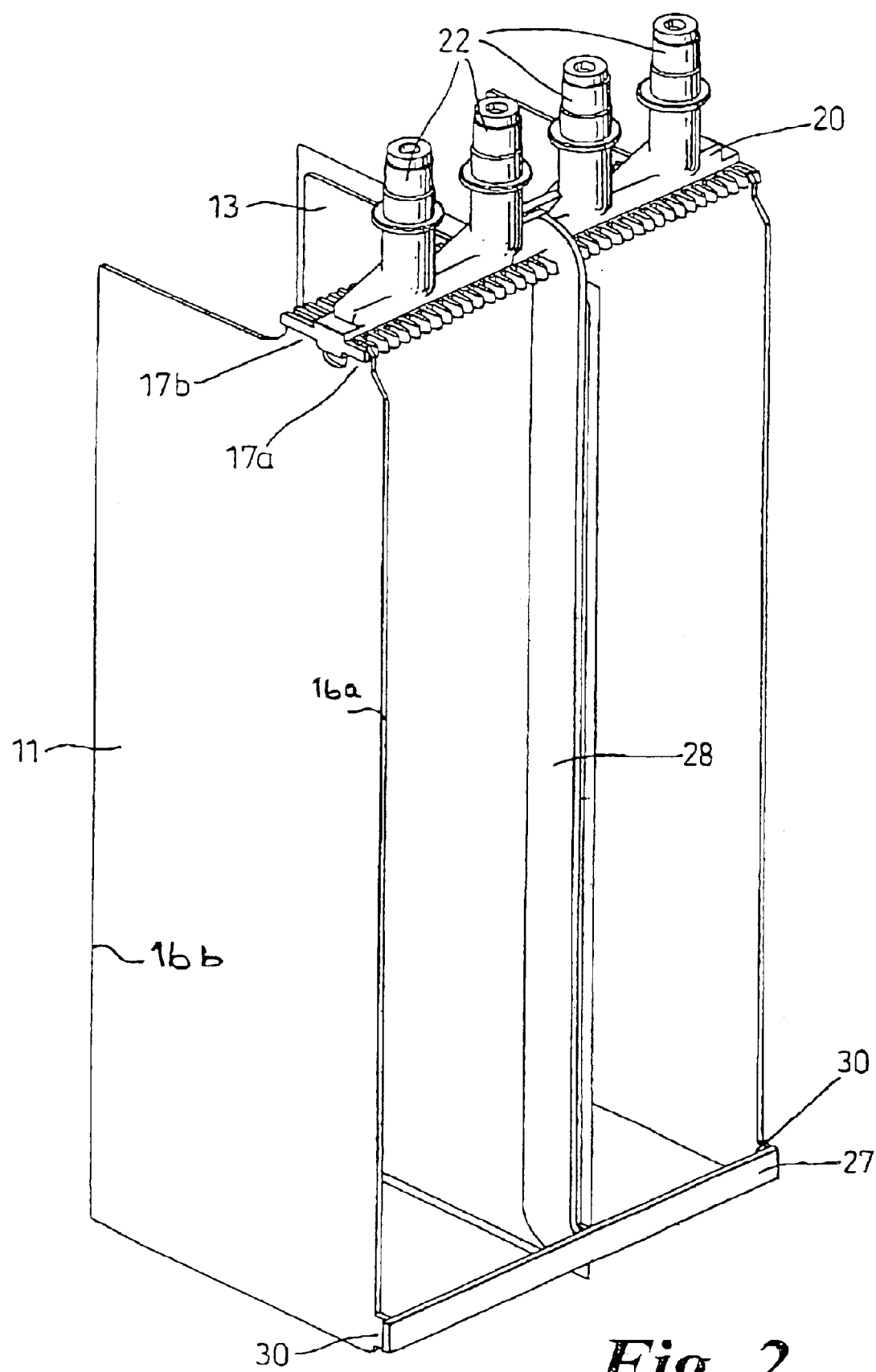
FIG. 2 shows a perspective view of the interior of a battery according to the second embodiment, only the arrangement of positive plates and attachments being shown.

In the second embodiment of the invention, shown in FIG. 2, the member of the first embodiment is replaced by a lead sheathed copper strip member 28 having the same general shape and dimensions but positioned between a negative plate (omitted from FIG. 2 in the interest of clarity) and a positive plate 11 (as shown) or at one end of the row of plates so as to lie parallel thereto, and separated from the plates by one or more separating sheets. The tags 18 on the lower edges of the positive plates 11 are replaced by tags 30 on a longer side, adjacent the corner with the lower edge. These tags 30 are connected to a lead sheathed copper or lead strip connector 27 which lies alongside the longer sides of the plates rather than alongside the lower edge as in the first embodiment.

DESCRIPTION OF THE PREFERRED EMBODIMENTS

In this second embodiment any problems associated with plate growth and/or the deposition of debris, are alleviated.

In either embodiment the high conductivity strip member 25 or 28 of copper sheathed with lead may be connected to the lead sheath of the connector 20 or to the copper connector 20 itself. The latter construction has the greater conductivity.

What is claimed is:

1. A battery comprising:
   a housing containing a plurality of positive plates connected in parallel and a plurality of negative plates connected in parallel, each of said positive plates being of substantially the same size and rectangular shape and having two long edges and a first short edge and a second short edge;
   a member in said housing, said member having a first end and a second end, said first end being electrically connected to each said first short edge of said positive plates adjacent to a first one of said two long edges and said second end being electrically connected to one of (a) each said second short edge of said positive plates adjacent to said first one of said two long edges and (b) each said first one of said two long edges of said positive plates immediately adjacent to said second short edge,
   said member extending parallel to said two long edges for most of a length of said member and comprising a material that has a greater conductivity than a material of said positive plates.

2. The battery of claim 1, wherein each of said negative plates has substantially the same size and rectangular shape and has two long edges and a first short edge and a second short edge, and further comprising a further member in said housing,
   said further member having a first end and a second end, said first end of said further member being electrically connected to each said first short edge of said negative plates, said second end of said further member being electrically connected to one of (a) each said second short edge of said negative plates and (b) each second one of said two long edges of said negative plates immediately adjacent to said second short edge,
   said further member comprising a material which has a greater conductivity than a material of said negative plates.

3. The battery of claim 1, wherein said negative plates and said positive plates are all substantially the same size and rectangular shape.

4. The battery of claim 1, wherein each said first short edge of said positive plates is connected to a connector that is electrically connected to a positive terminal of the battery.

5. The battery of claim 1, wherein each said second short edge of said positive plates is connected to a further connector that is connected to said member.

6. The battery of claim 5, wherein said further connector is of the same material as said positive plates.

7. The battery of claim 5, wherein said further connector is of the same material as said member.

8. The battery of claim 1, wherein the battery is a lead acid battery.

9. The battery of claim 8, wherein said member comprises copper covered in a lead sheath.

10. The battery of claim 9, wherein each said first short edge of said positive plates is connected to a connector that is electrically connected to a positive terminal of the battery, and wherein said connector comprises copper covered in lead.

11. The battery of claim 10, wherein said positive terminal comprises copper covered in lead.

12. The battery of claim 9, wherein said lead sheath is covered in an acid resistant material.

13. The battery of claim 12, wherein said acid resistant material is epoxy resin.

14. The battery of claim 8, wherein said member comprises a copper alloy covered in a lead sheath.

15. The battery of claim 14, wherein said copper alloy is brass.

16. The battery of claim 8, wherein said member comprises aluminum covered in a lead sheath.

17. The battery of claim 8, wherein said member comprises an aluminum alloy covered in a lead sheath.

* * * * *